United States Patent
Leuthold et al.

(10) Patent No.: US 6,799,892 B2
(45) Date of Patent: Oct. 5, 2004

(54) HYBRID SPINDLE BEARING

(75) Inventors: Hans Leuthold, Santa Cruz, CA (US); Michael D. Kennedy, Boulder Creek, CA (US); Alan Lyndon Grantz, Aptos, CA (US); Susan Immisch, Scotts Valley, CA (US); Norbert Steve Parsoneault, Scotts Valley, CA (US); Mohamed Mizanur Rahman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 67 days.

(21) Appl. No.: 10/186,479

(22) Filed: Jun. 28, 2002

(65) Prior Publication Data

US 2003/0138174 A1 Jul. 24, 2003

Related U.S. Application Data

(60) Provisional application No. 60/351,640, filed on Jan. 23, 2002.

(51) Int. Cl.[7] ............................................. F16C 17/10
(52) U.S. Cl. ..................................................... 384/110
(58) Field of Search .............................. 384/110, 107, 384/109, 108, 100

(56) References Cited

U.S. PATENT DOCUMENTS

| | | |
|---|---|---|
| 4,200,344 A | 4/1980 | Binns et al. |
| 4,394,091 A | 7/1983 | Klomp |
| 4,497,307 A | 2/1985 | Paar et al. |
| 4,597,676 A | 7/1986 | Vohr et al. |
| 4,710,034 A | 12/1987 | Tittizer et al. |
| 5,209,631 A | 5/1993 | Bernhardt |
| 5,871,285 A | 2/1999 | Wasson |
| 5,873,657 A | 2/1999 | Lee |
| 5,947,608 A * | 9/1999 | Kim ........................... 384/110 |
| 6,144,523 A | 11/2000 | Murthy et al. |
| 6,292,328 B1 | 9/2001 | Rahman et al. |

* cited by examiner

Primary Examiner—Lenard A. Footland
(74) Attorney, Agent, or Firm—Raghunath S. Minisandram; Jesus Del Castillo

(57) ABSTRACT

A bearing system in which an axially stiff narrow gap fluid dynamic gas bearing is preloaded by an axially less stiff larger gap fluid dynamic bearing. As an example two fluid dynamic bearings are provided spaced apart along a shaft, one of the bearings comprising a fluid dynamic bearing, the other comprising an air bearing. The fluid dynamic bearing has a larger gap, while the air bearing has a relatively small gap. The overall working surface area of the air bearing may be twice as much or more than the working surface area of the fluid bearing.

20 Claims, 4 Drawing Sheets

HYBRID SPINDLE BEARING

CROSS REFERENCE TO A RELATED APPLICATION

This invention is based on U.S. provisional application serial No. 60/351,640 filed Jan. 23, 2002 and entitled Hybrid Spindle Bearing, filed in the name of Hans Leuthold, Michael D. Kennedy, Alan Lyndon Grantz, Susan Immisch, Norbert Steve Parsoneault and Mohamed Miraznur Rahman. The priority of this provisional application is hereby claimed, and the application is incorporated herein by reference.

FIELD OF THE INVENTION

This invention relates generally to the field of hydrodynamic bearings, and more specifically to a design comprising two spindle bearings, one gap/air and one fluid in order to provide balance and reduced power consumption.

BACKGROUND OF THE INVENTION

Disc drives are capable of storing large amounts of digital data in a relatively small area. The disc drives store information on one or more spinning recording media. The recording media conventionally takes the form of a circular storage disk in a plurality of concentric circular recording tracks. A typical disk drive has one or more disks for storing information. This information is written to and read from the disks using read/write heads mounted on actuator arms that are moved from track to track across surface of the disk by an actuator mechanism.

Generally, the disks are mounted on a spindle that is turned by a spindle motor to pass the surfaces of the disks under the read/write heads. The spindle motor generally includes a shaft supporting from a base plate and a hub to which the spindle is attached having a sleeve into which the shaft is inserted. Permanent magnets, which are typically attached to the hub, interact with a stator winding to rotate the hub relative to the shaft. This description is consistent with a fixed shaft motor; however, the invention to be described below is as easily useable with a motor comprising a rotating shaft, an end of the shaft supporting the hub for rotation to support the rotation of the disks.

In either case, to facilitate rotation, one or more bearings are disposed between the hub or sleeve and the shaft.

Over time, disk drive storage density has tended to increase, and the size of the storage system has tended to decrease. This trend has led to greater emphasis on restrictive tolerances in the manufacturing and operation of magnetic storage disk drives. For example, to achieve increased storage density, read/write heads must be placed increasingly close to the surface of the storage disk.

As a result, the bearing assembly which supports the storage disk is of critical importance. A typical bearing assembly of the prior art comprises ball bearings supported between a pair of bearing paces which allow a hub of a storage disk to rotate relative to a fixed member. However, ball bearing assemblies have many mechanical problems such as wear, run-out and manufacturing difficulties. Moreover, resistance to operating shock and vibration is poor because of damping.

An alternative bearing design is a fluid dynamic bearing. In a fluid dynamic bearing, lubricating fluid such as air or liquid provides a bearing surface between a fixed member of the housing (e.g., the shaft) and a rotating member which supports the disk hub. Typical lubricants include oil or similar hydrodynamic fluids. Hydrodynamic bearings spread the bearing interface over a large surface area in comparison with a ball bearing assembly, which comprises a series of point interfaces. This is desirable because the increased bearing surface reduces wobble and run-out between the rotating and fixed members. Further, the use of fluid in the interface area imparts damping effects to the bearing which helps to reduce non-repeat run-out.

It is also known that the stiffness to power ratio is a primary way of measuring the efficiency of the spindle bearing assembly. Most known fluid dynamic bearings today in commercial use are made with oil as the fluid which is maintained in the gap between the two relatively rotating surfaces. This maintains the stiffness of the bearing, that is the resistance to shock and vibration; however, because of the relatively high viscosity of such fluids, which at lower temperatures, such as at startup, considerable power is consumed to establish and maintain high speed rotation.

SUMMARY OF THE INVENTION

It is an objective of the present invention to provide a bearing system in which the stiffness is maintained while the power consumption necessary to establish and maintain rotation of the bearing system is reduced.

It is a further objective of the invention to provide a bearing system in which a relatively stiff, low power system is achieved without utilizing fluid dynamic bearings with extremely small gaps in all embodiments.

These and other objectives of the invention are provided in a bearing system in which an axially stiff narrow gap fluid dynamic gas bearing is preloaded by an axially less stiff larger gap fluid dynamic bearing. More specifically, pursuant to the present invention a system is provided in which two fluid dynamic bearings are provided spaced apart along a shaft, one of the bearings comprising a fluid dynamic bearing, the other comprising an air bearing. In this exemplary embodiment, the fluid dynamic bearing has a larger gap, while the air bearing has a relatively small gap so that power consumption is diminished while stiffness is maintained.

According to embodiments of the present invention, the air bearing is substantially larger in size than the fluid bearing; the gap of the air bearing may be as much as one-fourth of the gap in the fluid bearing. The overall surface area of the air bearing may be twice as much or more than the working surface area of the fluid bearing.

In a typical embodiment, each of the bearings is a conical bearing comprising a cone supported on the shaft, with a surrounding sleeve providing a surface facing an outer surface of the cone, the gaps being defined between the surfaces of the cone and the sleeve. An alternative embodiment, one of the fluid dynamic bearings may be conical bearing, and the other a thrust plate bearing design.

Other features and advantages of the invention and alternative approaches will be apparent to a person of skill in the art who studies the following exemplary embodiments of the invention, given with reference to the following drawings.

DETAILED DESCRIPTION OF THE PREFERRED EMBODIMENTS

Figure 1:
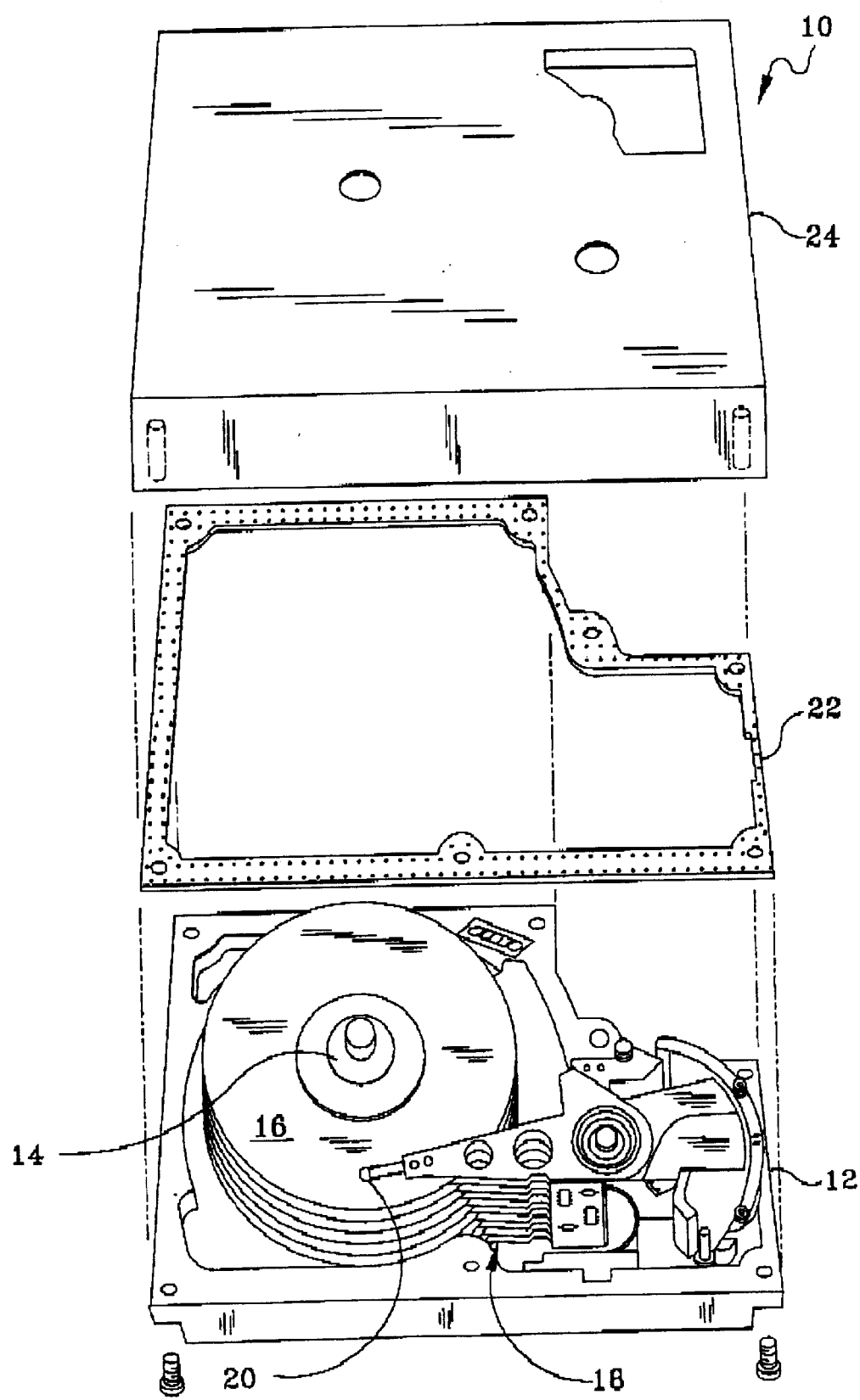
FIG. 1 is a perspective view of a disc drive in which the bearing system of the present invention is especially useful.

FIG. 1 depicts a plan view of an embodiment of a typical disc drive in which embodiments of the present invention, because of its stability and long life are especially useful. Referring to FIG. 1, the disc drive 10 includes a housing base 12 and a top cover 14. The housing base 12 is combined with cover 14 to form a sealed environment to protect the internal components from contamination by elements outside the sealed environment. The base and top cover arrangement shown in FIG. 1 is well known in the industry. However, other arrangements of the housing components have been frequently used and there is no particular limitation to the configuration of the housing.

The disc drive further includes a disk pack comprising one or more disks mounted for rotation on a spindle motor not shown by disc clamp 18. The disc pack 16 of one or more discs provides disks mounted for rotation about a central axis. Each disc surface has an associated read/write head 20 which is mounted to disc drive 10 for communicating with the disc surface. In the example shown in FIG. 1, read/write heads 20 are supported by flextures 22 which are in turn attached to head mounting arms 24 of an actuator body 26. The actuator shown in FIG. 1 is of the type known as a rotary moving coil actuator and includes a voice coil motor shown generally at 28. The voice coil motor rotates the actuator body 26 with its attached read/write heads 20 about a pivot shaft 30 to position read/write heads 20 over a desired data track along a path 32. While the rotary actuator is shown in FIG. 1, the invention may be used with other disc drives having other type of actuators such as linear actuators; in fact, the specific disc drive shown herein is intended only to be exemplary, not to be limiting in any sense.

Figure 2:
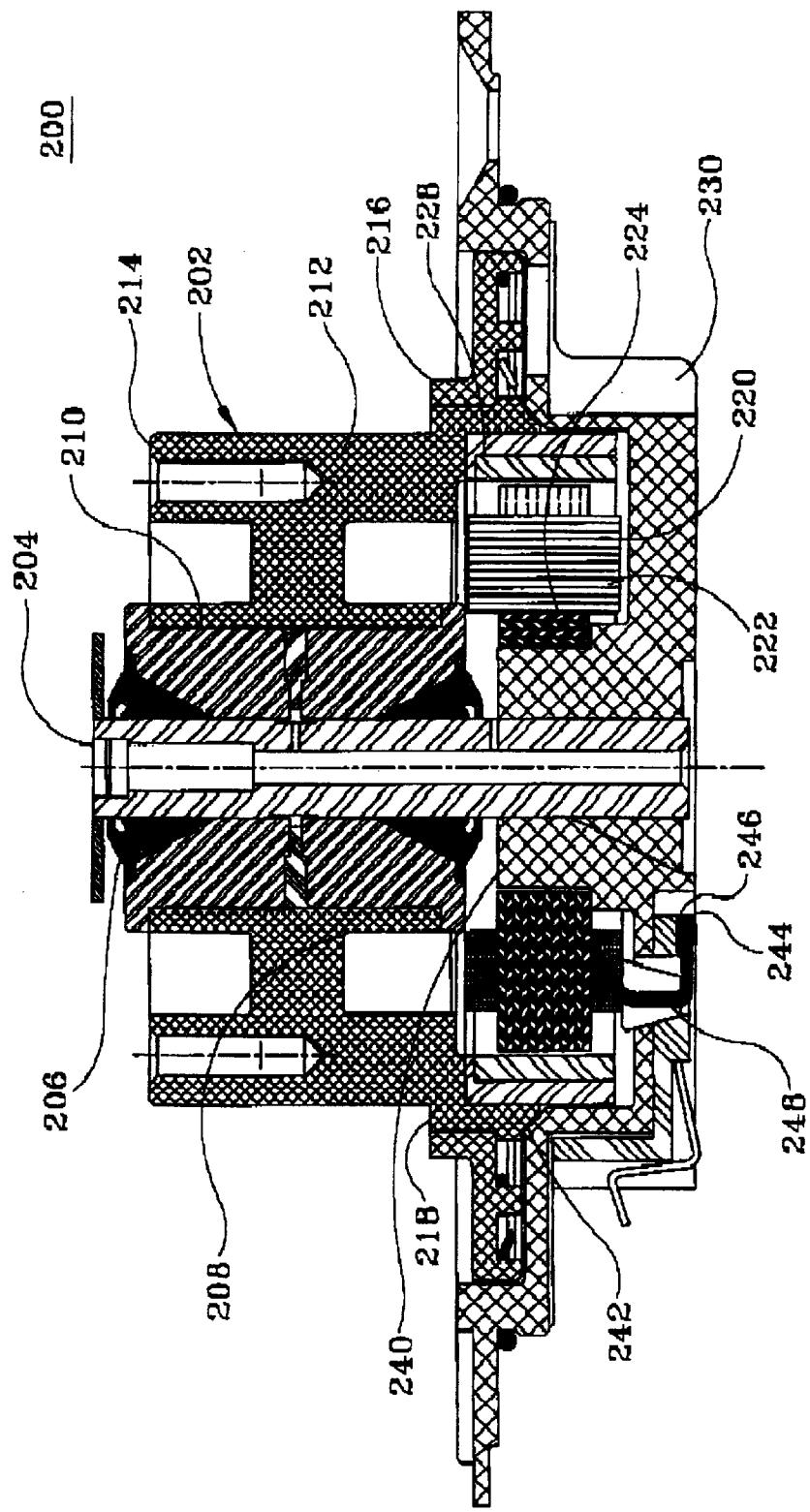
FIG. 2 is a vertical sectional view of a known bearing system as used in the prior art.

FIG. 2 is a vertical sectional view of a known spindle motor including a set of conical hydrodynamic bearings 206, 208 which support the shaft 204 and hub 202 for relative rotation. The motor is a brushless direct current motor 200 comprising a hub 202 rotatably mounted about the stationary shaft 204 by the upper and lower bearings 206 and 208 respectively. The hub 202 which supports one or more discs such as are shown in FIG. 1 for rotation is formed in a generally inverted U shape as seen in cross section, and has an inner annulus sleeve 210 and an outer cylindrical surface 212 and a top portion 214. Outer cylindrical surface 212 includes a shoulder 216 for supporting one or more discs in the contaminant free environment which encloses the motor and discs. A plurality of storage discs separated by spacers or washers could easily well be stacked along the vertical length of outer cylindrical surface 212. The inner portion of hub 202 operably receives a stator, generally designed 220, including a stator lamination stack 224 and stator windings 222. A permanent magnet 228 is mounted on a back iron 229 supported from outer annular arm 212 for magnetically interacting with magnetic reactor stator laminations stack 224 and stator windings 222. It is to be understood that a plurality of permanent magnets may make up the magnet 226 in this design.

The disc drive motor 200 is mounted to a frame or base member 230 of disc drive assembly 200 by inserting member 230. Thereto by inserting it in the recess in member 230.

Stator support 240 surround stationary shaft 204 and supports stator 220 in a substantially vertical position. Stator support 240 comprises a boss 242 formed in base plate number 230 which serves to maintain disc drive motor 200 in a spaced relation with respect to base member 230. The stator 220 is bonded to the base 230.

A circuit connector 244 is mounted to a lower surface of the base member 230. The circuit connector 244 is electronically connected to stator windings 222 by a wire 248 for electrical communication between the stator windings and a printed circuit board (not shown). By energization of this circuitry, we create torque to run at right speed, control signals cause constant speed rotation of the hub about the shaft 204 as supported by the upper and lower conical bearings 206, 208.

Considering the known fluid dynamic bearings such as shown in FIGS. 1 and 2, the efficiency of the spindle bearing assembly may be expressed in the form of a stiffness to power ratio with stiffness being the ability to withstand shock, and power being power consumed to establish and maintain relative rotation between the two sides of the bearing as supported by the fluid in the gap between those two sides. Typically, in designing a motor using hydrodynamic bearings, the specification is established either for stiffness or for power; the objective then becomes to both achieve the specification, and to optimize this ratio of stiffness to power.

It is known that the stiffness to power ratio is proportional to one over the gap squared; hence the smallest gap will lead to the greatest efficiency. It is further known that power is proportional to speed squared, times the viscosity times the $OD^3$, times the length of the bearing, divided by the gap.

It is also known that the viscosity of air is about $\frac{1}{256}$ of a typical oil at 70° C. which is considered to be a typical operating temperature for a fluid bearing; it is further known that the viscosity of air is independent of temperature, a fact that eliminates the dilemma of having to make tradeoffs of low temperature power (which is where most power is consumed in a fluid bearing) versus high temperature stiffness (which is where, due to the decrease in viscosity, stiffness is typically lost in a bearing utilizing fluid in the gap).

Figure 3:
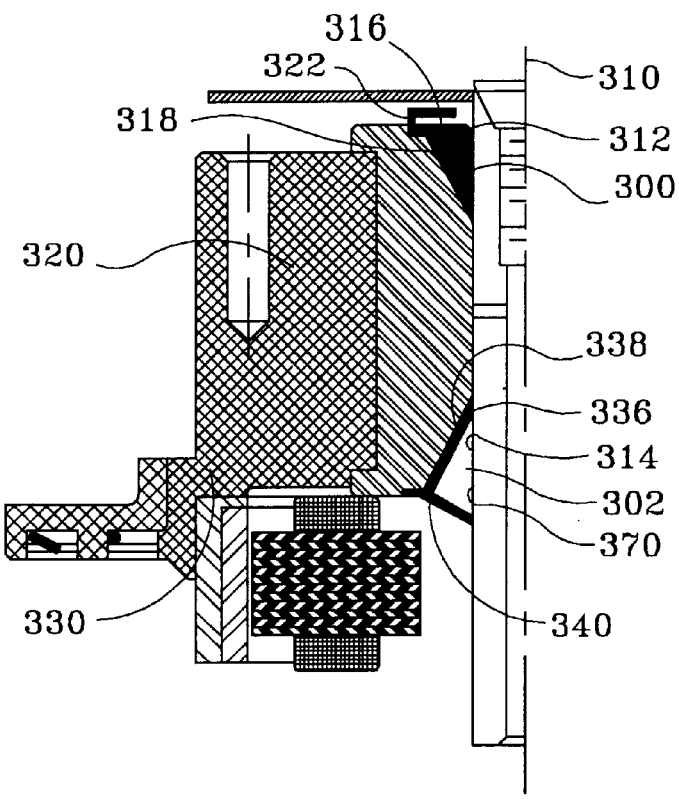
FIG. 3 is a vertical sectional view of a bearing system according to the present invention.

An example of the technology making use of this invention is shown in FIG. 3 which is a partial sectional view of a motor wherein the hub is supported for rotation about the shaft by a pair of spaced conical bearings 300, 302 designed in accordance with the principals of this invention.

In the example of the embodiment of FIG. 3 comprises a shaft 310 having the cones 312 the upper air bearing 300 is a air or gas bearing which is defined between an outer surface 316 of cone 312 and an inner surface 318 of sleeve 320. The gap 322 between surfaces 316 and 318 is relatively small, as compared to the gap of the fluid bearing 302. However, the air bearing surfaces of the cone 312 and facing sleeve 320 is relatively large compared to bearing surfaces of the fluid bearing 302.

Thus the sleeve 320 which supports the associated hub 330 and the disc or discs it is supported for rotation by a relatively large conical air bearing surface 316, 318, which support the sleeve 320 across a relatively small gap 322; and also by a fluid dynamic bearing 302 having a relatively smaller outer surface 336 facing a surface 338 of the sleeve 320 across a fluid filled gap 340. This fluid filled gap 340 is relatively larger than the air gap 322. It has been determined by experimentation analysis that the targeted efficiency improvement can be reached by moving as closely as possible in the direction of making the working surfaces (which define the gap) of the air bearing substantially larger (up to twice as large or more) as the working surfaces 336, 338 of the fluid bearing 302. Further, the gap 322 of the air/gas bearing 300 should be substantially smaller (down to ¼ the size or smaller) of the gap 340 of the fluid bearing 302. Of course the overall goal is to make the smallest possible bearing on the fluid side, and the largest possible bearing on the air side the ratios mentioned above are approximations or goals which do not have to be fully achieved to realize the benefits of the invention. The objective can further be stated as achieving a balance of axial thrust forces, taking into account differences in gravity. Of course, the necessary radial force to achieve the desired stiffness in the system must also be taken into account.

By adopting these relative designs and, gap sizes, one bearing provides the pre-load for the other bearing. That is, one bearing has a very low impedance or low stiffness because the gap(, in the case of FIG. 3, the gap 340 of the bearing 302) is significantly bigger than the gap at which the other bearing (bearing 300) provides the same stiffness. The result is that with the combination, stiffness is maintained but power consumed is a minimum.

Figures 4, 5:
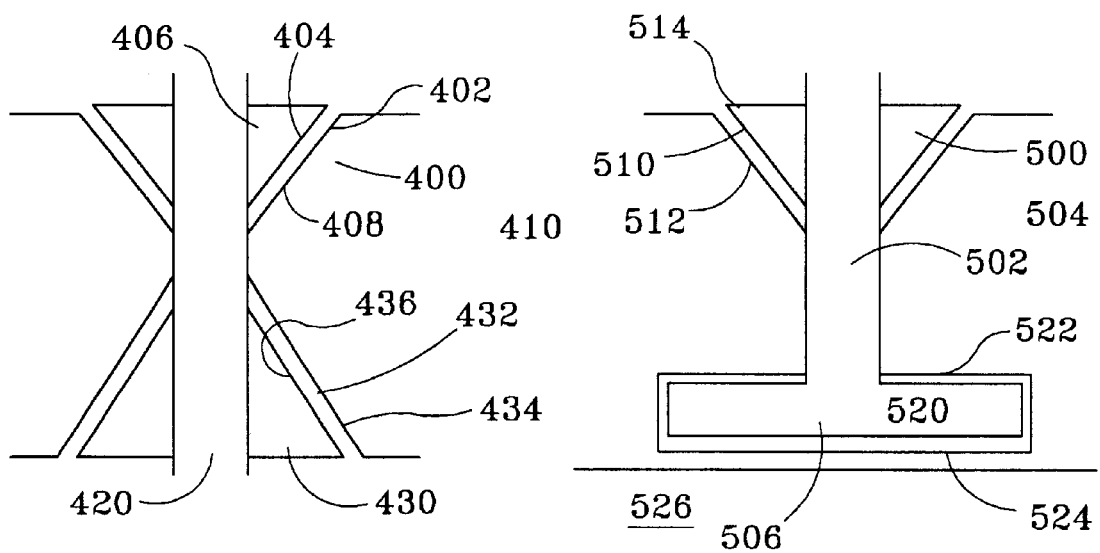
FIG. 4 is a vertical section of an alternative embodiment of the present invention.
FIG. 5 is a vertical section view of a further alternative embodiment of the present invention.

The same is true in the design of FIG. 4 which is basically inverted relative to FIG. 3, where the small fluid bearing 400 has a relatively large gap 402 between the surfaces 404 of the cone 406 and the facing surface 408 of the sleeve 410; the larger air bearing 430 spaced along a shaft 420 from the fluid bearing 400 a narrow gap 432 defined between a surface 434 of sleeve 410 and a surface 436 of cone 430. Surfaces 434 and 436 are substantially larger than the surfaces 404, 408 of fluid bearing 400 to maintain stiffness while reducing power consumption.

Yet another approach is shown in FIG. 5 where a conical bearing 500 supported on a shaft 502 supports a sleeve 504 for relative rotation. The conical bearing 500 cooperates with a thrust plate bearing generally indicated at 506. In this as in the previous examples, the conical bearing comprises two opposing surfaces, a surface 510 of the cone 500 and a surface 512 of the sleeve 504 which together define a gap 514. Spaced along the shaft is a thrust bearing 506 having a thrust plate 520 designed in accordance with known principals defining gaps 522 with the sleeve and 524 with a counter plate indicated at 526. Depending on the relative size of the bearing, either may be fluid or gas bearing being, with the gas bearing being larger. As with the relative showings of FIGS. 3 and 4, the combination of conical bearing and thrust plate bearing may be flown or defined in either orientation, but with the air/gas bearing being defined to have the substantially smaller gap and the substantially larger air bearing surface.

In all of these instances, the objective has been to maintain the dynamic performance while minimizing power consumption by providing that one of the bearings has a large gap with a high viscosity fluid, the bearing having a small working surface dimensions, and the other bearing having a small gap and a low viscosity gas or air in the gap and relatively large working surface dimensions.

Both of these bearings can be dimensioned so that the dynamic performance on the spindle from both bearings is as similar as possible to each other, so that no imbalance movement results. Further the total axial play in such a bearing combination will be somewhat diminished relative to the axial play obtained in a corresponding pair of fluid bearings. Thus, although the axial play is not idealized, it is an improvement over standard two bearing designs in terms of power consumption and stiffness and does achieve some reduction in axial play.

The disclosed embodiments are achievable with current manufacturing technologies at reasonable cost. By the same token, the stiffness, while not improved because of the presence of one air bearing, is either maintained or close to being maintained while the total power consumed is minimized. For example, today's high-speed spindles take about half of the whole mechanical power in the system; a hybrid such as disclosed above can save about 30% of that power consumption.

Figure 6A:
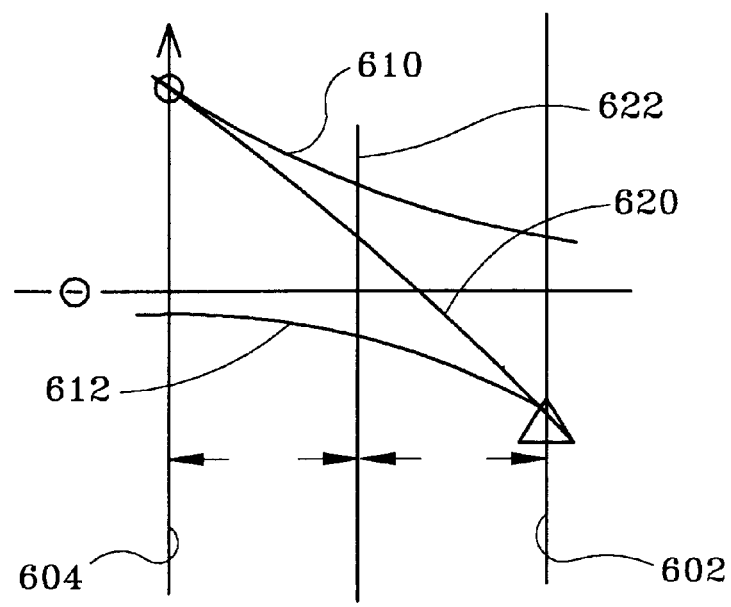
FIGS. 6A and 6B are graphs illustrating the trade-offs which are considered in optimizing the design of the present invention.
Figure 6B:
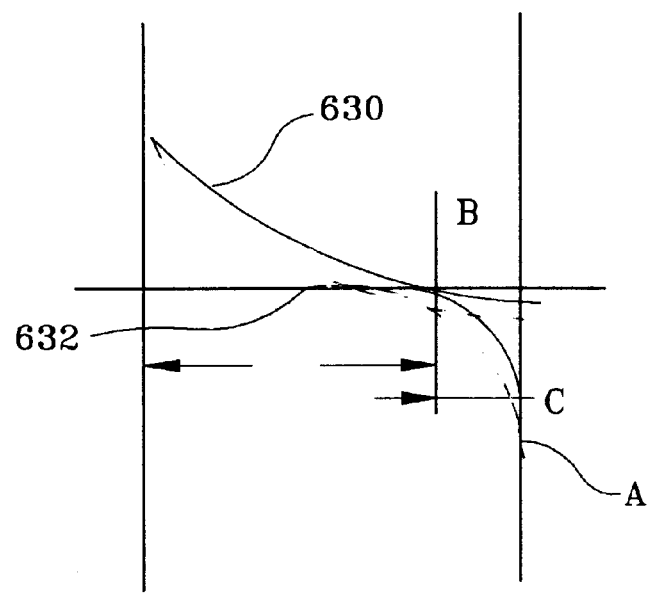

Referring next to FIGS. 6A and 6B, these graphs explain in some further measure the way the systems operate. Looking first at 6A, which is a graphical representation of the way a pair of two fluid/oil bearings works, the horizontal axis represents play and the vertical lines represents the touch points at the end of the play, play being a measure of travel of one surface across the gap toward the other surface, the touch point, of course, being where a touch occurs. For example, in any of the designs, if the rotor, which in the designs shown is typically the sleeve and hub, moves all the way up, then touch occurs on the right side at line 602; and if the rotor moves all the way down, touch occurs at the left line 604. So the distance between the two vertical bars 602, 604 is the total axial play which is available for the rotor relative to the stator. This can be termed play or gap (gap is typically half the play). The vertical axis measures resulting thrust force.

Comparing for example now FIG. 6A to the exemplary embodiment shown in FIG. 2 (two fluid bearings), when the system is at rest, and the rotor and hub 320 is resting down upon the stator or bearing cone 370, then there is an extremely large force against the rotor because of the compression of the oil in the gap. By the same token, if the rotor is pushed all the way up, there will be a thrust force which is pushing down on the rotor, which would increase the higher the rotor goes because of the system is now compressing the oil or fluid in the upper fluid dynamic bearing. Looking at FIG. 6A, where the load lines are symmetrical because the fluid bearings are substantially the same of the load lines 610, 612 of the upper and lower bearings respectively are shown. Thus, the amount of thrust exerted by the lower bearing decreases as the rotor spins up and moves further away from the stator; by the same token, the amount of thrust exerted by the upper bearing increases as the force of gravity is overcome, the rotor spins up closer to the stator and the fluid or oil is compressed. And of course the net load on to the rotor is the sum of these curves plus the force of gravity. Thus the composite line 620 is simply the sum of those two curves, with the indicator 622 indicating the balance or operating point where most operation occurs.

In contrast, FIG. 6B shows the load lines for FIG. 3 with an upper air bearing and lower fluid bearing. Here lower fluid bearing exerts thrust up as represented by line 630 in this FIG. 6B; the upper air bearing exerts thrust down (line 632) which increases rapidly as the rotor moves up, closing the gap. It can be seen by comparing the two load lines that the load line 630 of a fluid or oil bearing is much shallower than the load line of an air bearing 632. So the load line for the air bearing 632 at start up is operating at the point A and on balance the system operates at the point generally marked B in FIG. 6B. This is because after the air bearing starts and rotates and the gap diminishes, the force increases dramatically and at a much higher rate than in the case of an oil bearing because of the very small air gap and the immediate compression of the air in that gap.

For clarity it should be pointed out that the force is measured on the hub or on the rotating body so the force is the force being exerted on the rotating body at the supporting bearing. Looking at FIG. 6B and FIG. 3, it can be seen that the air bearing which is the upper bearing is pushing down on the rotating body with dramatically increasing force as the system spins up. Thus, the combination of a fluid bearing and air or gas bearing spaced apart along a shaft can be combined to maintain the stiffness of the system, while diminishing the power consumed in the system.

Other features and advantages of the invention would be apparent to a person of skill in the art who studies this disclosure. Therefore, the scope of the invention is to be limited only by the following claims.

What is claimed is:

1. A fluid dynamic bearing system, comprising:
   an inner member;
   an outer member;
   a first conical element coupled to the inner member and having a first outer surface;
   a second conical element coupled to the inner member and having a second outer surface, the first conical element and the second conical element spaced apart from one another along the inner member;
   a first fluid dynamic bearing having a first gap, the first fluid dynamic bearing disposed along the first outer surface and configured to support the relative rotation of the outer member and the inner member; and
   a second fluid dynamic bearing having a second gap, the second fluid dynamic bearing disposed along the second outer surface and configured to support the relative rotation of the outer member and the inner member, the first gap substantially smaller than the second gap.

2. The fluid dynamic bearing system of claim 1, wherein the first gap is approximately one-fourth the size of the second gap.

3. The fluid dynamic bearing system of claim 1, wherein the first fluid dynamic bearing has a first radius, and the second fluid dynamic bearing has a second radius, the first radius substantially larger than the second radius.

4. The fluid dynamic bearing system of claim 3, wherein the first radius is approximately twice the size of the second radius.

5. The fluid dynamic bearing system of claim 1, wherein the first gap contains a first fluid, the first fluid comprising a gas.

6. The fluid dynamic bearing system of claim 5, wherein the gas is air.

7. The fluid dynamic bearing system of claim 5, wherein the second gap contains a second fluid, the second fluid comprising a liquid.

8. The fluid dynamic bearing system of claim 1, wherein the first fluid dynamic bearing has a greater stiffness than the second fluid dynamic bearing.

9. The fluid dynamic bearing system of claim 1, wherein the second fluid dynamic bearing preloads the first fluid dynamic bearing.

10. The fluid dynamic bearing system of claim 1, wherein the fluid dynamic bearing system is coupled to a base, the first fluid dynamic bearing disposed distally from the base, and the second fluid dynamic bearing disposed proximally to the base.

11. The fluid dynamic bearing motor of claim 10, wherein the first gap is approximately one-fourth the size of the second gap.

12. The fluid dynamic bearing system of claim 10, wherein the first fluid dynamic bearing has a first radius, and the second fluid dynamic bearing has a second radius, the first radius substantially larger than the second radius.

13. The fluid dynamic bearing system of claim 12, wherein the first radius is approximately twice the size of the second radius.

14. The fluid dynamic bearing system of claim 10, wherein the first gap contains a first fluid, the first fluid comprising a gas.

15. The fluid dynamic bearing system of claim 14, wherein the gas is air.

16. The fluid dynamic bearing system of claim 14, wherein the second gap contains a second fluid, the second fluid comprising a liquid.

17. The fluid dynamic bearing system of claim 10, wherein the first fluid dynamic bearing has a greater stiffness than the second fluid dynamic bearing.

18. The fluid dynamic bearing system of claim 10, wherein the second fluid dynamic bearing preloads the first fluid dynamic bearing.

19. The fluid dynamic bearing system of claim 10, wherein the outer member is coupled to a hub, the hub configured to support one or more discs.

20. The fluid dynamic bearing system of claim 10, wherein the fluid dynamic bearing system is disposed within a disc drive.

* * * * *